United States Patent
Caceres et al.

(10) Patent No.: US 9,020,117 B2
(45) Date of Patent: Apr. 28, 2015

(54) PERFORMING HUMAN CLIENT VERIFICATION OVER A VOICE INTERFACE

(75) Inventors: Barry Mark Caceres, Las Vegas, NV (US); Jessica Lynne Pamdeth, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1173 days.

(21) Appl. No.: 12/342,489

(22) Filed: Dec. 23, 2008

(65) Prior Publication Data
US 2010/0158233 A1 Jun. 24, 2010

(51) Int. Cl.
H04M 3/42 (2006.01)
H04M 3/436 (2006.01)

(52) U.S. Cl.
CPC ................................... H04M 3/436 (2013.01)

(58) Field of Classification Search
USPC .................................................. 379/207.02
See application file for complete search history.

(56) References Cited

U.S. PATENT DOCUMENTS

| | | | |
|---|---|---|---|
| 5,991,367 A * | 11/1999 | Robuck | 379/88.24 |
| 7,162,019 B1 | 1/2007 | Mullis et al. | |
| 7,331,518 B2 * | 2/2008 | Rable | 235/380 |
| 7,526,306 B2 * | 4/2009 | Brems et al. | 455/518 |
| 2002/0143550 A1 * | 10/2002 | Nakatsuyama | 704/270.1 |
| 2004/0131164 A1 | 7/2004 | Gould | |
| 2005/0090237 A1 | 4/2005 | Holt et al. | |
| 2005/0097106 A1 | 5/2005 | Lineman | |
| 2006/0193453 A1 * | 8/2006 | Price | 379/88.23 |
| 2007/0033256 A1 | 2/2007 | Ben-Itzhak | |
| 2007/0165811 A1 | 7/2007 | Reumann et al. | |
| 2008/0005037 A1 * | 1/2008 | Hammad et al. | 705/67 |
| 2008/0008105 A1 | 1/2008 | Black et al. | |

FOREIGN PATENT DOCUMENTS

| | | |
|---|---|---|
| KR | 1019970078353 | 12/1997 |
| KR | 1020040035642 | 4/2004 |
| KR | 1020040054946 | 6/2004 |
| KR | 1020070018591 | 2/2007 |

OTHER PUBLICATIONS

Office Action for U.S. Appl. No. 12/342,413 dated Sep. 21, 2011.
Korean Office Action 9-5-2011-022514631. Dated Apr. 26, 2011.
Korean Office Action 9-5-2011-022698971. Dated Apr. 27, 2011.
Notice of Allowance for U.S. Appl. No. 12/342,413 dated Jul. 2, 2012.
Office Action for U.S. Appl. No. 12/342,413 dated Feb. 17, 2012.
Nangle, Brenda, et al. "PALS: Personal Assistants Which Learn for Intelligent Call Screening." Dublin, Ireland, 1998.

* cited by examiner

*Primary Examiner* — Amal Zenati
(74) *Attorney, Agent, or Firm* — Mollborn Patents, Inc.; Fredrik Mollborn (57) ABSTRACT

Methods and apparatus, including computer program products, implementing and using techniques for managing telephone calls. Upon completion of a telephone call, a telephone services subscriber is provided with a post-call interface. The post call interface allows the subscriber to define how future telephone calls from the caller are to be managed. Instructions are received from the subscriber through the post-call interface. The instructions pertain to the management of future telephone calls from the caller. The received instructions are saved.

20 Claims, 5 Drawing Sheets

PERFORMING HUMAN CLIENT VERIFICATION OVER A VOICE INTERFACE

CROSS-REFERENCE TO RELATED APPLICATIONS

This application is related to U.S. patent application Ser. No. 12/342,413, entitled "PERFORMING HUMAN CLIENT VERIFICATION OVER A VOICE INTERFACE" and filed on Dec. 23, 2008, the entire content of which is incorporated herein by reference.

BACKGROUND

This invention relates to verification of telephone calls. Unwanted telephone calls are an issue with American phone service subscribers. Services like the National "Do Not Call" list provide some relief from marketing calls, but do govern many types of so called "cold calls." Telephone services subscribers with Caller ID also have the ability to block calls from an unknown or withheld telephone number, but with little specificity.

Some telephone services subscribers have personal toll-free numbers that are managed by a password or set of passwords that can be distributed to those whom the subscriber allows to call. This prevents unwanted callers and charges on the toll-free number, but this system is tightly coupled as the password must be provided to the caller in advance and therefore the callers must be known to the subscriber.

Current technologies using caller ID, dial-tone and voice CAPTCHAs (Completely Automated Public Turing test to tell Computers and Humans Apart) provides for alternative authentication mechanisms where providers can challenge incoming callers and require valid responses before connecting a call or sending the caller to voice mail.

While there has been much work done in the field of screening and handling unwanted callers, these systems and methods provide limited functionality with respect to blocking unwanted telephone calls. In some cases, the system and methods described above may even block calls that are desired by the telephone services subscriber. Thus, there is a need for improved techniques for blocking unwanted telephone calls.

SUMMARY

In general, in one aspect, the invention provides methods and apparatus, including computer program products, implementing and using techniques for managing telephone calls. Upon completion of a telephone call, a telephone services subscriber is provided with a post-call interface. The post call interface allows the subscriber to define how future telephone calls from the caller are to be managed. Instructions are received from the subscriber through the post-call interface. The instructions pertain to the management of future telephone calls from the caller. The received instructions are saved.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

The various embodiments of the invention described herein pertain to the management of incoming telephone calls to a telephone services subscriber. In particular, the various embodiments of the invention relate to the management of telephone calls received from telephone numbers that are unknown to, or withheld from, a telephone services subscriber. Various embodiments of the invention can be implemented at a telecommunications services provider to allow their subscribers to record, and modify at will, one or more challenge questions and corresponding numeric (tone-dialed) responses or voice responses (for example, if implemented in conjunction with a voice recognition system). Only callers who provide the correct answer to the challenge questions are allowed to ring through to the subscriber's telephone.

In accordance with various embodiments, the subscriber to a system such as the one described above can create challenge questions asking the caller to press certain digits on their tone-dialed phone in order to prevent auto-dialed calls. Some embodiments allow the subscriber to get even more sophisticated by requiring that reasoning, math or logic be used in discerning the response, in order to avoid advanced automated callers that try to circumvent the measure using speech recognition. In some embodiments, calls from strangers can be reduced by requiring that the caller have some personal knowledge of the recipient. In yet other embodiments, strict authentication by means of a password would also be possible.

As will be discussed in further detail below, some embodiments allow the subscriber to create a profile, from which the challenge questions can be generated automatically depending on the subscriber's choices. For example, the challenge questions can vary based on the day of the week, the time of day, the location of the caller, whether the subscriber has indicated a free or busy status, and so on. The subscriber can also define groups of callers, where each caller within the group will receive the same challenge question(s). As will also be discussed in further detail below, the various embodiments of the invention can be implemented at the telecommunication services provider (i.e., a server-side implementation) or at the subscriber's telephone (i.e., client-side implementation), depending on the capabilities of the subscriber's telephone.

The invention can be implemented to include one or more of the following advantages over existing methods and systems. The telephone services subscriber gets improved control over who has access to them through their telephone phone services by creating subscriber-defined challenge-response criteria. The telephone subscriber can permit callers to reach the subscriber's telephone based on their ability to answer the challenge question rather than the having to provide a specific password or passwords to one or more individuals. Through automatic generation of challenge questions based on a profile, the telephone subscriber can create a very dynamic set of authentication methods that are difficult to circumvent by various automated technologies by the callers, thereby filtering out a large portion of unwanted telephone calls. The challenge questions can be varied according to a schedule. The scheduled challenge questions can be grouped according to one or more authorization levels. The system can determine an action to take with regard to connecting an incoming telephone call, based on the authorization level and the current date and time. The subscriber of the telephone services can immediately correct the call screening or forwarding configuration when an unwanted call is connected to his telephone or when the caller is able to leave a voice message.

Various embodiments of the invention will now be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Verification of an Incoming Telephone Call

Figure 1:
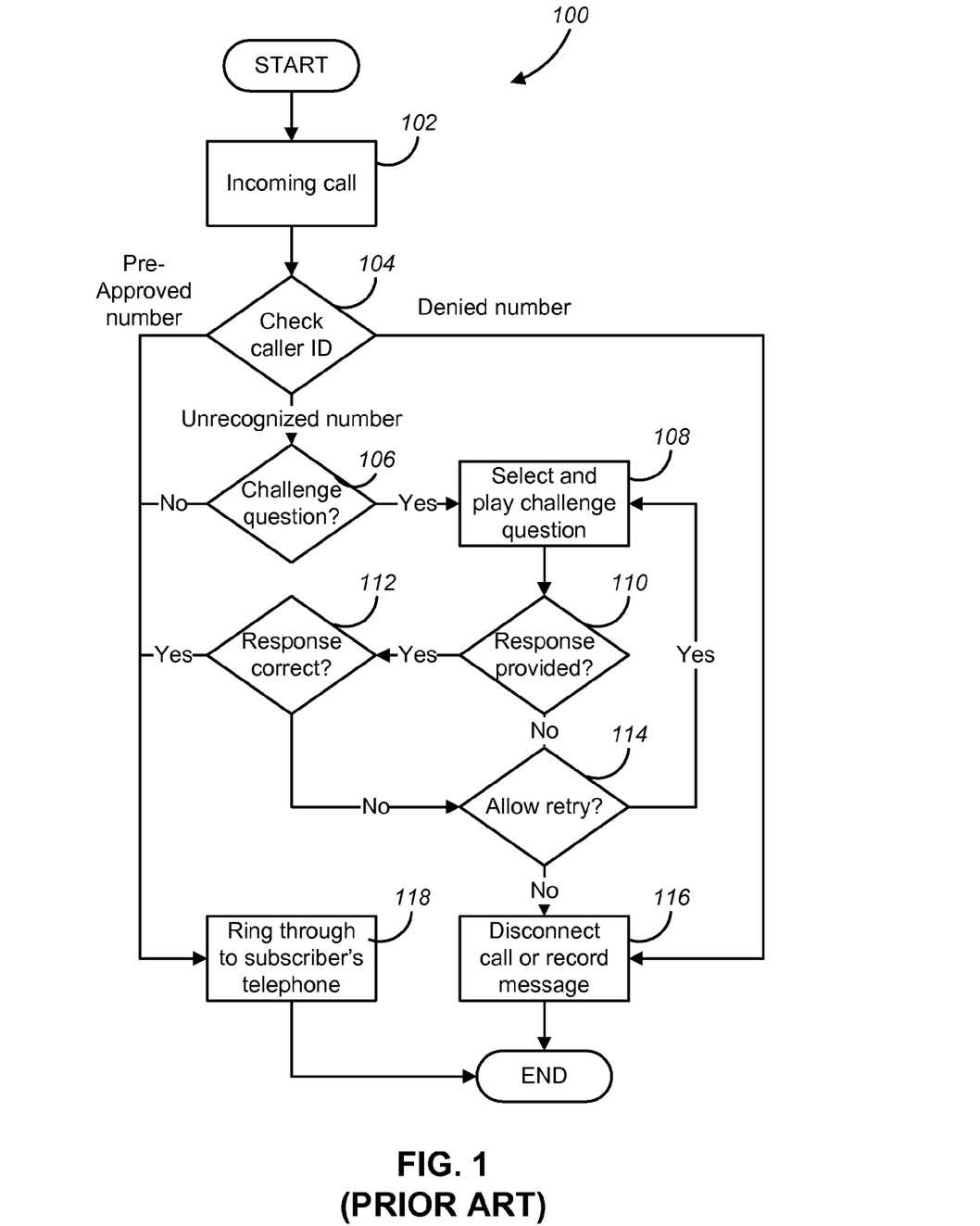
FIG. 1 shows a prior art process for verification of an incoming telephone call.

FIG. 1 shows a current process (100) for verification of an incoming telephone call. The process (100) starts by a call coming in to the subscriber (step 102). The process then checks the caller ID (step 104). If it is determined that the call is from a pre-approved telephone number, the call goes through to the subscriber's telephone and causes the telephone to ring (step 118), and the process ends. The list of pre-approved telephone numbers can be configured by the subscriber, so that people calling from a telephone number on the list of pre-approved telephone numbers can call through to the subscriber without the inconvenience of having to respond to any challenge questions.

If it is determined in step 104 that the incoming call originates from a denied telephone number, then the call is disconnected or a message is recorded (step 116), in accordance with the subscriber's pre-configured settings, and the process (100) ends. Similar to the list of pre-approved telephone numbers, the subscriber can create a list of denied numbers that will be automatically disallowed based on the caller ID, and without playing any challenge questions.

If it is determined in step 104 that the incoming call originates form an unknown telephone number, then the process proceed with checking if a challenge question is available (step 106). The availability of a challenge question can be determined on a number of factors pre-configured by the telephone subscriber. In some embodiments, challenge questions are only used when the incoming call is from one or more specific area codes, or from 1-800-numbers, for example. If it is determined in step 106 that a challenge question is not available, then the process continues to step 118 and the subscriber's telephone rings, just like a conventional telephone call.

If it is determined in step 106 that a challenge question is available, then the challenge question is selected and played (step 108). The challenge questions can require numeric (e.g., tone-dialed) responses or voice responses (if implemented in conjunction with a voice recognition system).

When the challenge question has been played in accordance with the subscriber's configuration, the process checks whether a response has been provided (step 110). If a response is not provided, the process determines whether a retry should be allowed in accordance with the subscriber's configuration (step 114). The subscriber can typically configure how many retries should be allowed before the call is disconnected or a message is recorded. If a retry is allowed, then the process returns to step 108 and repeats steps 108-114 until no more retries are allowed. When no more retires are allowed, the process disconnects the call or records a message (step 116), as described above.

If it is determined in step 110 that a response has been provided. The process checks whether the response is correct (step 112). If the response is correct, the process proceeds to step 118 and the subscriber's telephone rings. If the response is not correct, the process determines whether a retry is allowed (step 114), and proceeds as described above until no more retries are allowed and the call is disconnected or a message is recorded (step 118), which ends the process. Similar to what was described above for when no responses are provided in step 110, the subscriber can configure the handling of failed responses, e.g., how many incorrect responses will be accepted before the telephone call is disconnected or a message is recorded.

Figure 4:
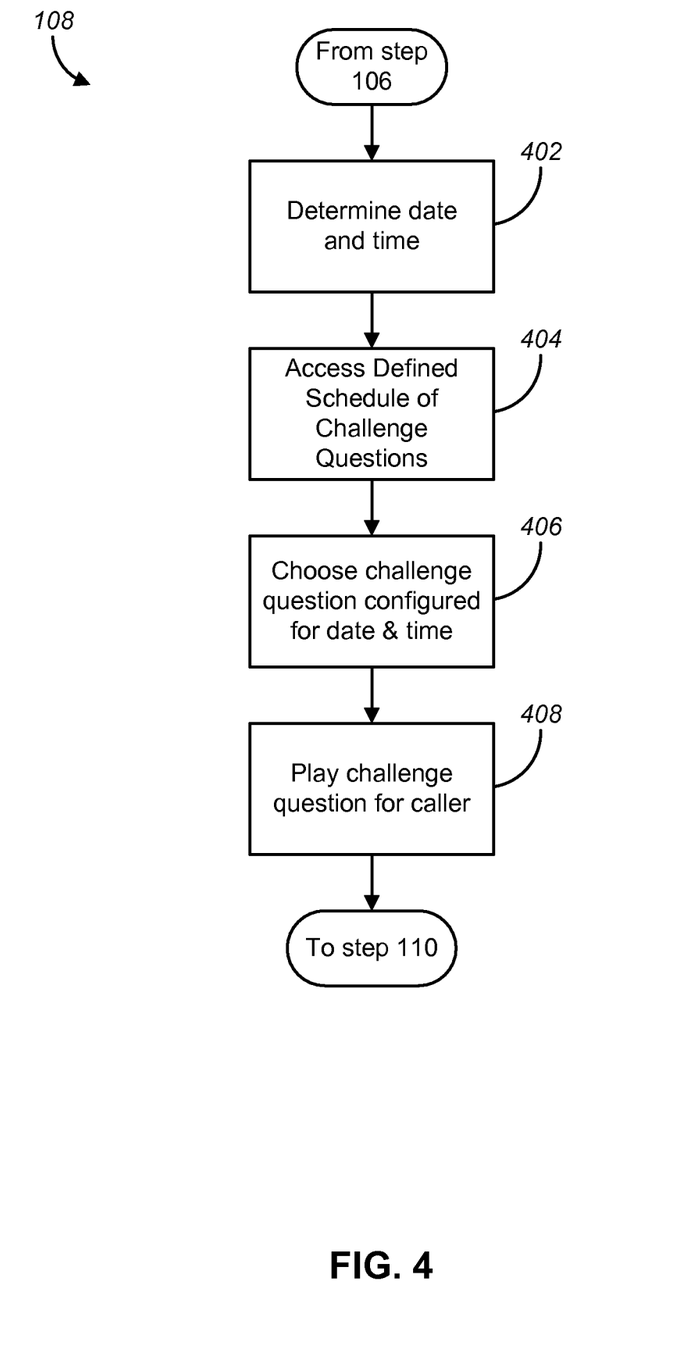
FIG. 4 shows a more detailed view of step 108 of FIG. 1, for selecting and playing a challenge question by schedule in accordance with one embodiment of the invention.

The various embodiments of the invention provide improvements to the above process, in particular with respect to step 108, in which a challenge question is selected and played. A more detailed view of step 108, in accordance with one embodiment of the invention, selecting and playing a challenge question is shown in FIG. 4. As can be seen in FIG. 4, first a date and a time is determined (step 402). Next, a defined schedule of challenge questions is accessed (step 404). The schedule can be pre-defined by the subscriber, for example, when creating a profile for the system. The profile can be created, for example, through a web interface or by using a touch tone or voice interface (or various combinations thereof) on the subscriber's telephone. Typically, the subscriber can specify in the schedule that certain questions should only be active during a particular period of time. For example, more difficult questions can be used in the middle of the night, maybe even in combination with some kind of password, while simpler questions can be used during the day.

Different types of challenge questions can serve different purposes. For example, there may be challenge questions that restrict auto-dialers. Some examples of such questions can include "What is three plus two?" "What is the number after seven?," How many moons does planet Earth have?," and so on. Other challenge questions can be aimed at restricting calls from strangers. Some examples of such questions can include "What is the first letter of the company I work for?" "What are the first three letters of my middle name?," "How old am I?," and so on.

Next, a challenge question is selected among the one or more challenge questions that the subscriber has configured for that particular time and date (step 406), and the selected challenge question is played to the caller (step 408). The process then continues with step 110, as describe above.

It should be noted that the schedule can also contain information with respect to steps 116 and 118, described above. There may be times when a subscriber does not want to receive any telephone calls at all at his regular telephone, for example, if he does not want to be interrupted during dinner or if he is asleep or away on vacation. In such circumstances, the subscriber can configure the schedule so that incoming calls from callers that provided correct answers are directly routed to voicemail or, for example, forwarded to a different telephone number, such as the subscriber's mobile telephone.

Figure 5:
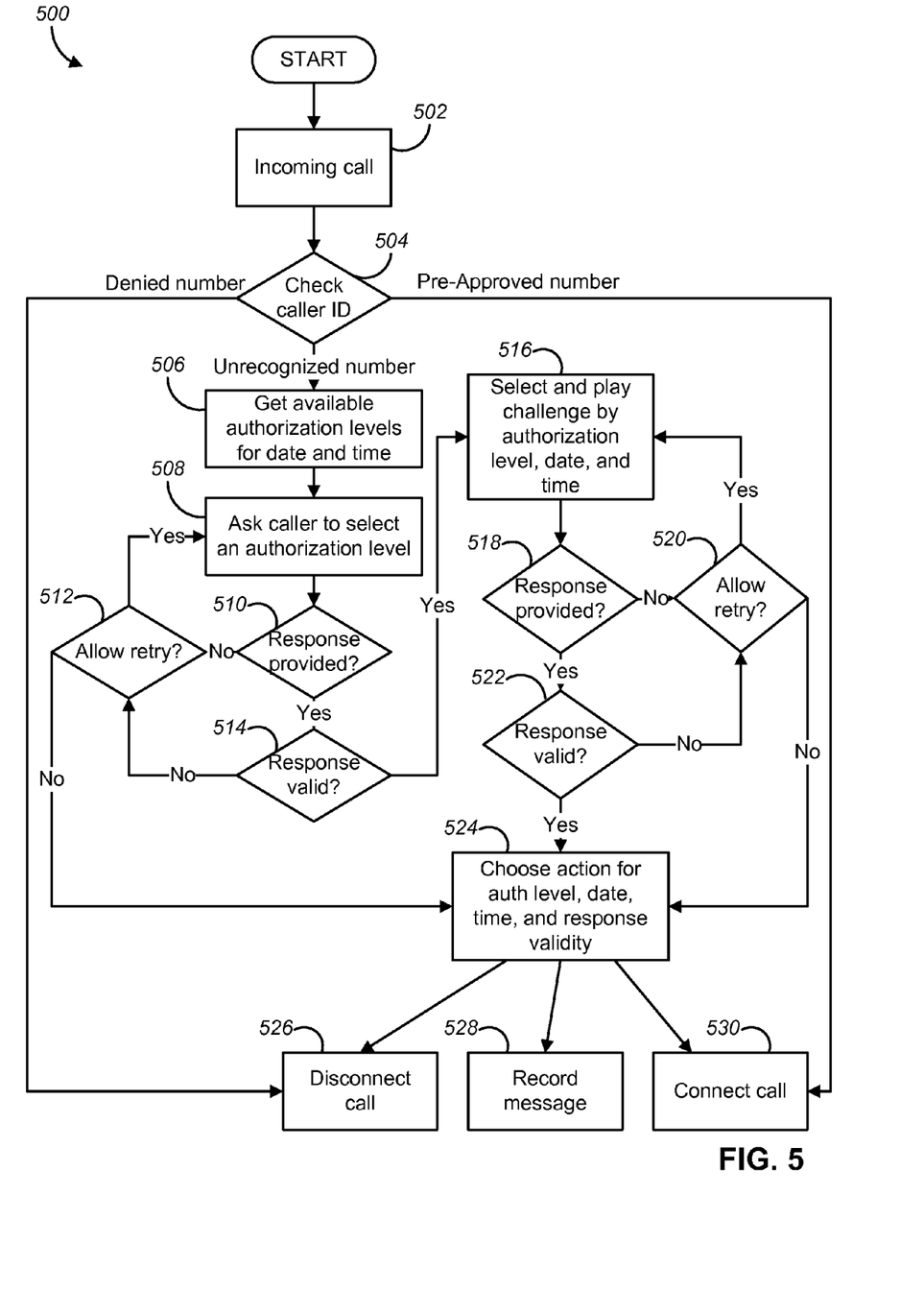
FIG. 5 shows a process for a challenge to an incoming caller in accordance with one embodiment of the invention.

FIG. 5 shows a process (500) for a challenge to an incoming caller in accordance with one embodiment of the invention, in which different authorization levels are used. As can be seen in FIG. 5, the process (500) starts with an incoming call being received by the service provider (step 502). The caller ID is then checked (step 504). If it is determined, based on the caller ID, that the call is from a pre-approved caller, then the call is connected (step 530) and the process ends. If it is determined, based on the caller ID, that the call does not originate from a pre-approved caller then the call is disconnected (step 530) and the process ends.

If it is determined, based on the caller ID, that the call is from an unrecognized caller, then the process retrieves the available authorization levels for the particular time and date when the call is received (step 506). Typically, the authorization levels are specified by the subscriber in conjunction with establishing the schedule of challenge questions, as described above with respect to FIG. 4. The authorization levels can be used to select challenge questions that are appropriate for the caller. Some examples of authorization levels include "Family," "Friend," "Associate," or "Guest," and for each authorization level a set of appropriate challenge questions can be defined by the subscriber. For example, the "Family" authorization level can include challenge questions to which only the immediate or extended family would know the answer (e.g., "What was my grandmother's maiden name?"), whereas the "Friend" authorization level may contain questions to which most friends would know the answer (e.g., "What is the make and color of my car?").

The caller is then asked to select an authorization level (step 508) among the authorization levels retrieved in step 506. The process examines whether a response is provided (step 510). If no response is provided, the process determines whether a retry is allowed (step 512). This determination can be made as described above, for example, based on a number of allowable retry attempts, selected by the subscriber. If no more retries are allowed, the call is disconnected and the process ends (step 526). If more retries are allowed, the process returns to step 508, where the caller again selects an authorization level, and the process continues to step 510, as described above.

If it is determined in step 510 that a response is provided, the process examines whether the response is valid (step 514). If the response is invalid, the process returns to step 512 and determines yet again whether any retries are allowed, and the process continues as described above. If it is determined in step 514 that the response is valid, the process continues to select a challenge question by the established authorization level, date, and time, and plays the challenge question to the caller, as was described above with respect to FIG. 4 (step 516).

Next, it is examined whether a response is provided (step 518). If a response is not provided, it is examined whether any retires are allowed (step 520), in accordance with the subscriber's predefined settings. If retires are allowed, the process returns to step 516 and continues as described above. If no retires are allowed, the call is disconnected (step 526), or alternatively directed to voicemail (step 528) and the process ends.

If it is determined in step 518 that a response is provided, the process continues to determine whether the response is valid (step 522). In the event of a non-valid response, the process returns to step 520, and examines whether any retries are available, as described above. If the response is valid, an action is chosen in accordance with the subscriber's instructions (step 524). One example of such an action is to record a voicemail, as shown in step 528. Another example is to connect the call to the subscriber, as shown in step 530. This ends the process (500). Of course, it should be noted that there are other possible actions as well, some of which were described above, such as forwarding the call to a different telephone number specified by the subscriber, and so on. In some embodiments, the authorization level can also be used, possibly in combination with the defined schedule to determine how to route the incoming phone call. For example, callers that are authorized as "Family" may be able to ring through to the subscriber at any time of the day, while callers that are authorized as "Associates" or "Friends," for example, will be sent to voicemail after a particular time of the day, such as when the subscriber goes to bed.

Post-Call Follow-Up

Some embodiments of the invention further define improvements whereby a post-call interface is provided to the subscriber to use after completion of a telephone call. The interface gives the subscriber the ability to either add the caller whose call just completed to their approved list or, in the case of an unwanted call, add the caller to the denial list (if caller ID is available) used in the above processes, and/or to review the challenge question that was posed to the caller to see if it needs to be changed to make it more exclusive of unwanted callers.

In some embodiments, this post-call interface can be automatically presented to the subscriber upon disconnection of the caller if the subscriber stays on the line. In other embodiments the post-call interface can be presented as an automated callback mechanism from the service provider, for example, through a special ring signal. In yet other embodiments, the post-call interface can be actively invoked by the subscriber by dialing a special sequence on their phone (e.g.: "*32"). The details of the post-call interface will now be described with reference to FIGS. 2 and 3.

Figure 2:
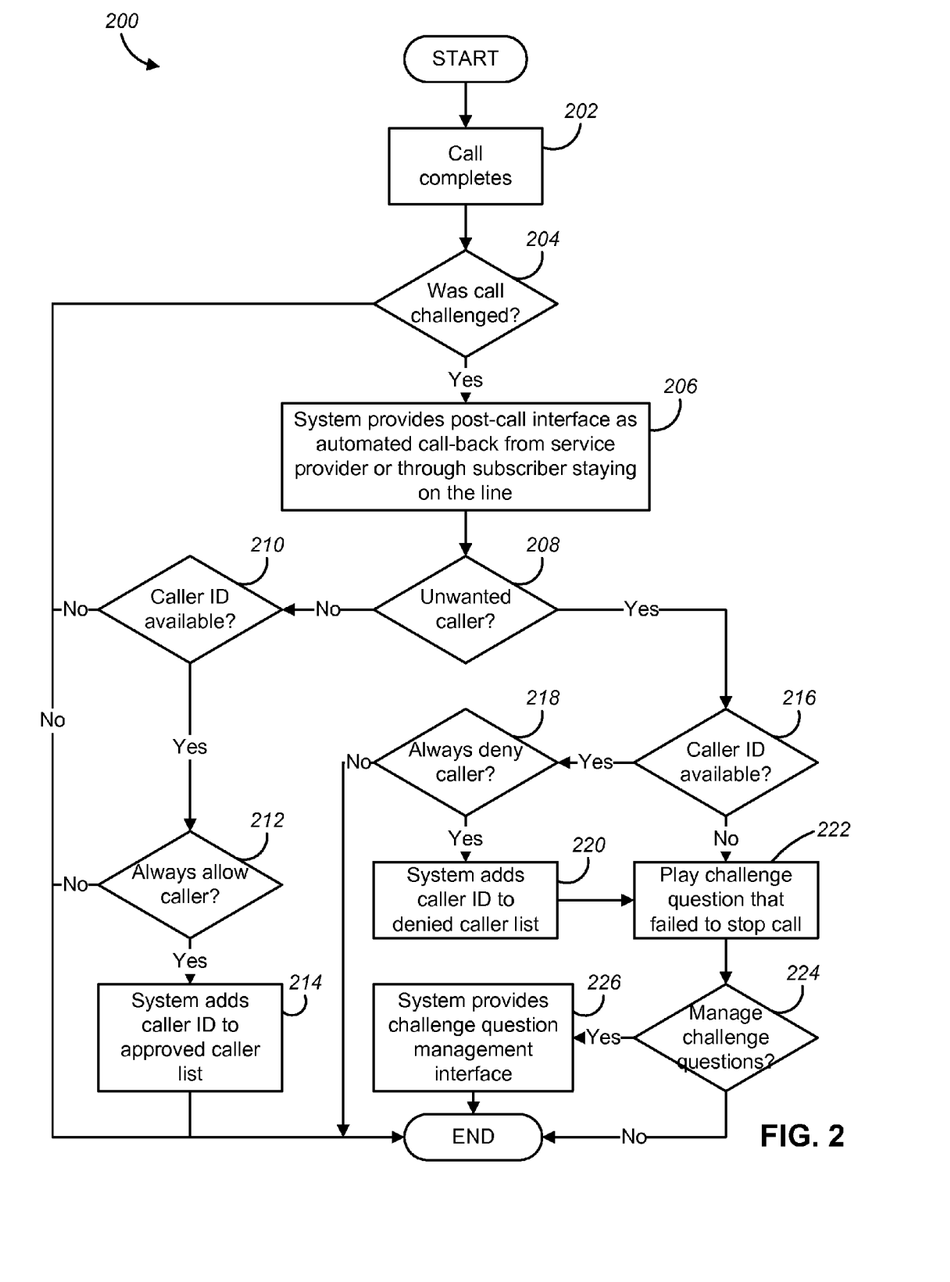
FIG. 2 shows a service-initiated post-call follow-up process in accordance with one embodiment of the invention.

FIG. 2 shows a service-initiated post-call follow-up process (200) in accordance with one embodiment of the invention. As can be seen in FIG. 2, the process (200) starts by a telephone call being completed (step 202). The process then determines whether the telephone call was challenged (step 204). If the telephone call was not challenged, the process (200) ends. However, if the telephone call was challenged, a post-call interface is provided as an automated call-back from the service provider, or simply by the subscriber remaining on the line and not hanging up (step 206). In the case of an automated call back, the call back typically takes place within a short time after the telephone call is completed, and is signified by a special ring signal, so that the subscriber can decide whether or not to pick up the receiver and activate the post-call interface.

Next, it is determined whether the telephone call was from an unwanted caller (step 208). This is typically indicated by the subscriber. If the telephone call was not from an unwanted caller, it is determined whether a caller ID is available (step 210). If no caller ID is available, the process (200) ends. However, if a caller ID is available, the subscriber is asked whether he or she would like to always allow the caller (step 212). If the subscriber does not want to always allow the caller, the caller will be presented with challenge questions also in the future, and the process (200) ends. If the subscriber wishes to always allow the caller, the caller ID is added to the approved caller list (step 214), and the process (200) ends.

Returning to step 208, if it is determined that the caller is unwanted, the process checks whether a caller ID is available (step 216). If a caller ID is available, the subscriber can decide whether to always deny the caller (step 218). If the caller is not always to be denied, the process (200) ends, and the caller will be presented with challenge questions, just like before. If it is determined that the caller should always be denied, then the caller ID is added to the denied caller list (step 220), and the challenge question that failed to stop the telephone call is played back to the subscriber, so that the subscriber gets a chance to modify or delete the challenge questions (step 222). This is also the case if it is determined in step 216 that no caller ID is available, since it will not be possible to add the caller to the denied list. However, a different challenge question might possibly fend off the caller in the future.

After the challenge question has been played back in step 222, the subscriber is provided with the option to manage challenge questions, for example, to modify or delete or add new challenge questions (step 224). If the subscriber decides not to manage challenge questions, the process (200) ends. Otherwise, the subscriber is provided with a challenge question management interface (step 226) before the process ends, which allows the subscriber to change or otherwise manage the challenge questions.

Figure 3:
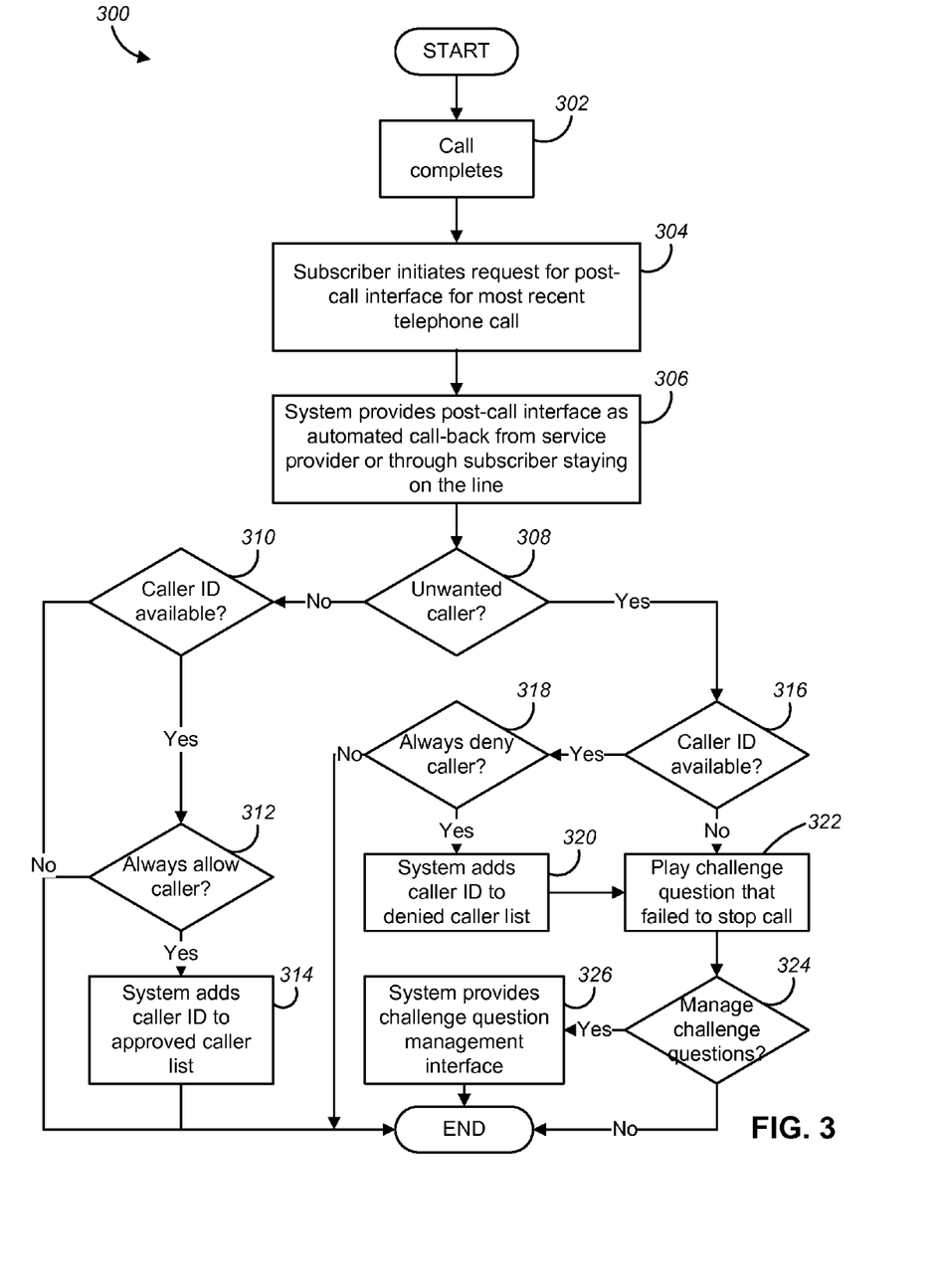
FIG. 3 shows a subscriber-initiated post-call follow-up process in accordance with one embodiment of the invention.

As was discussed above, the post-call follow-up process can also be subscriber-initiated. FIG. 3 shows such a post-call follow-up process (300) in accordance with one embodiment of the invention. As can be seen in FIG. 3, the process (300) is similar to the process (200) that was described above with reference to FIG. 2. The main difference is that the determination about whether the call was challenged (step 204) in FIG. 2 has been replaced in FIG. 3 with a subscriber-initiated request for a post-call interface for the last call (step 304). This initiation can occur, for example, by dialing a certain sequence of numbers on the subscriber's telephone, or through logging on to the telephone services provider's website and selecting the call from a call list. After initiating the post-call interface, either as a voice or touch tone interface, or as a web interface, the process (300) continues as described above for steps 206-226 of FIG. 2.

The flowcharts and block diagrams in the figures referred to above illustrate the architecture, functionality, and operation of possible implementations of systems, methods and computer program products according to various embodiments of the invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, various embodiments of the invention can include a system, method or computer program product. Accordingly, the invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention can take the form of a computer program product embodied in any tangible medium of expression having computer-usable program code embodied in the medium.

Any combination of one or more computer usable or computer readable medium(s) can be used. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to wireless, wireline, optical fiber cable, RF, and so on.

Computer program code for carrying out operations of the invention can be written in any combination of one or more programming languages, including an object oriented programming language such as Java, Smalltalk, C++ or the like and conventional procedural programming languages, such as the "C" programming language or similar programming languages. The program code can execute entirely on the subscriber's computer, partly on the subscriber's computer, as a stand-alone software package, partly on the subscriber's computer and partly on a remote computer or entirely on the remote computer or server. In the latter scenario, the remote computer can be connected to the subscriber's computer through any type of network, including a local area network (LAN) or a wide area network (WAN), or the connection can be made to an external computer (for example, through the Internet using an Internet Service Provider).

A number of implementations of the invention have been described. Nevertheless, it will be understood that various modifications may be made without departing from the spirit and scope of the invention. For example, the scheduling and post-call interfaces can be accessed through a graphical user interface on a computer, for example, as a web-page that provides functionality for entering the desired information, and to which the subscriber can log in with a username and password. There can also be local software on the subscriber's computer that can interface with the subscriber's telephone system, which enables all the functionality discussed above, such as the challenge questions, scheduling and post-call interfaces to be managed locally by the subscriber without any involvement by the telephone services provider. Accordingly, other embodiments are within the scope of the following claims.

The invention claimed is:

1. A computer-implemented method for managing telephone calls, the method comprising:
   upon completion of a telephone call, automatically providing a post-call interface to a telephone services subscriber, the post call interface allowing the subscriber to define how future telephone calls from the caller are to be managed;
   receiving instructions from the subscriber through the post-call interface, the instructions pertaining to the management of future telephone calls from the caller, wherein future calls from the caller are to be managed without providing a specific password or passwords to the caller; and
   saving the received instructions.

2. The method of claim 1, wherein the post-call interface is provided as a web page.

3. The method of claim 1, wherein the post-call interface is provided at least in part as a touch-tone interface that can be accessed through a subscriber's telephone.

4. The method of claim 1, wherein the post-call interface is provided in response to the subscriber remaining on the line upon completion of the telephone call.

5. The method of claim 1, wherein the post-call interface is provided as an automated callback service from the subscriber's telephone services provider.

6. The method of claim 1, wherein the post-call interface is provided in response to the subscriber dialing a special sequence of numbers on the subscriber's telephone.

7. The method of claim 1, wherein receiving instructions from the subscriber includes one of: receiving instructions to add the caller to a list of denied telephone calls, receiving instructions to add the caller to a list of allowed telephone calls, receiving instructions to play one or more challenge questions to the caller before future telephone calls from the caller are passed through to the subscriber's telephone, receiving instructions to direct the caller to voicemail, receiving instructions to direct the caller to a different telephone number, and receiving instructions to leave a particular message to the caller.

8. The method of claim 7, further comprising:
   defining one or more challenge questions that are variable based on one or more of the following: a specific day, a specific time of day, a location of the caller, an authorization level, and a status indication by the subscriber.

9. The method of claim 7, further comprising:
   specifying whether the one or more challenge questions should be answered by one or more of: at least one tone-dialed numeric response by a human caller, and at least one voice response by a human caller.

10. The method of claim 7, further comprising:
    configuring an allowed number of attempts for the caller to respond to the one or more challenge questions; and
    configuring a handling of failed responses received from the caller.

11. The method of claim 1, wherein the method is a server-implemented method at a telecommunications provider's device.

12. The method of claim 1, wherein the method is a client-implemented method at a subscriber's device.

13. A non-transitory computer program product for managing telephone calls, the computer program product comprising:
    a computer usable medium having computer usable program code embodied therewith, the computer usable program code comprising:
    computer usable program code configured to upon completion of a telephone call, automatically provide a post-call interface to a telephone services subscriber, the post call interface allowing the subscriber to define how future telephone calls from the caller are to be managed;
    computer usable program code configured to receive instructions from the subscriber through the post-call interface, the instructions pertaining to the management of future telephone calls from the caller, wherein future calls from the caller are to be managed without providing a specific password or passwords to the caller; and
    computer usable program code configured to save the received instructions.

14. The computer program product of claim 13, wherein the post-call interface is provided as one or more of: a web page and a touch-tone interface that can be accessed through a subscriber's telephone.

15. The computer program product of claim 13, wherein receiving instructions from the subscriber includes one of: receiving instructions to add the caller to a list of denied telephone calls, receiving instructions to add the caller to a list of allowed telephone calls, receiving instructions to play one or more challenge questions to the caller before future telephone calls from the caller are passed through to the subscriber's telephone, receiving instructions to direct the caller to voicemail, receiving instructions to direct the caller to a different telephone number, and receiving instructions to leave a particular message to the caller.

16. The computer program product of claim 15, further comprising:
    computer usable program code configured to define one or more challenge questions that are variable based on one or more of the following: a specific day, a specific time of day, a location of the caller, an authorization level, and a status indication by the subscriber.

17. The computer program product of claim 15, further comprising:
    computer usable program code configured to specify whether the one or more challenge questions should be answered by one or more of: at least one tone-dialed numeric response by a human caller, and at least one voice response by a human caller.

18. The computer program product of claim 15, further comprising:
    computer usable program code configured to configure an allowed number of attempts for the caller to respond to the one or more challenge questions; and
    computer usable program code configured to configure a handling of failed responses received from the caller.

19. The computer program product of claim 13, wherein the computer program product is a server-implemented computer program product at a telecommunications provider's device.

20. The computer program product of claim 13, wherein the computer program product is a client-implemented computer program product at a subscriber's device.

* * * * *